(12) United States Patent
Tsunashima et al.

(10) Patent No.: US 8,550,889 B2
(45) Date of Patent: Oct. 8, 2013

(54) GAME DEVICE, METHOD AND INFORMATION STORAGE MEDIUM FOR CONTROLLING GAME DEVICE BASED ON GAME SITUATIONS

(75) Inventors: Tadaaki Tsunashima, Kanagawa (JP); Taichi Wakabayashi, Kanagawa (JP); Naohiro Iizuka, Tokyo (JP); Hiroshi Nakanishi, Tokyo (JP); Yuta Yahiro, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 9 days.

(21) Appl. No.: 13/216,587

(22) Filed: Aug. 24, 2011

(65) Prior Publication Data

US 2012/0052943 A1    Mar. 1, 2012

(30) Foreign Application Priority Data

Aug. 24, 2010   (JP) ................................ 2010-187689

(51) Int. Cl.
*A63F 13/00*   (2006.01)
(52) U.S. Cl.
USPC ................................................ 463/4; 463/31
(58) Field of Classification Search
USPC ...................... 463/3–4, 40, 7–8, 31
See application file for complete search history.

(56) References Cited

U.S. PATENT DOCUMENTS

| | | | | |
|---|---|---|---|---|
| 6,155,924 A * | 12/2000 | Nakagawa et al. | ................ | 463/4 |
| 6,168,519 B1 * | 1/2001 | Nakagawa et al. | ................ | 463/4 |
| 6,280,323 B1 * | 8/2001 | Yamazaki et al. | ................ | 463/4 |
| 2005/0255899 A1 * | 11/2005 | Takahashi et al. | ................ | 463/3 |
| 2006/0160592 A1 * | 7/2006 | Endo et al. | ......................... | 463/8 |
| 2007/0087827 A1 * | 4/2007 | Hirota | .............................. | 463/40 |
| 2007/0232375 A1 * | 10/2007 | Izumi et al. | ........................ | 463/7 |
| 2011/0124386 A1 | 5/2011 | Kondo et al. | | |
| 2011/0306415 A1 * | 12/2011 | Tanaka | ............................ | 463/31 |

FOREIGN PATENT DOCUMENTS

| | | |
|---|---|---|
| JP | 2004202007 A | 7/2004 |
| JP | 2010-22493 A | 2/2010 |

OTHER PUBLICATIONS

Japanese Office Action corresponding to Japanese Patent Application No. 2010-187689, dated Jul. 31, 2012.
J. League, LETS MAKE A PROFESSIONAL SOCCER CLUB!, 3, Dengeki PlayStation Media Works, Apr. 25, 2003, vol. 9, No. 12, pp. 180-183.

* cited by examiner

*Primary Examiner* — Dmitry Suhol
*Assistant Examiner* — Jason Yen
(74) *Attorney, Agent, or Firm* — Sughrue Mion, PLLC

(57) ABSTRACT

A display control section (72) controls a display unit to display an image on which a first axis corresponding to first information about a situation of a game and a second axis corresponding to second information about a situation of the game are set. A receiving section (74) receives an operation for specifying a position or an area in the image. A first condition relating to the first information and a second condition relating to the second information are acquired based on the results of reception by the receiving section (74). A game-character control section (84) controls the action of the at least one game character in a case where the results of determinations of whether or not the first information and the second information about the current situations of the game respectively satisfy the first condition and the second condition are predetermined results.

8 Claims, 12 Drawing Sheets

FIG.10

| SCORE SITUATION | TIME PERIOD | STRATEGY |
|---|---|---|
| $\Delta S<0$ | 60:00~90:00 | A |
| $\Delta S<0$ | 15:00~45:00 | C |
| $\Delta S=0$ | 15:00~75:00 | D |
| $\Delta S=0$ | 60:00~90:00 | A |
| $\Delta S=0$ | 45:00~75:00 | B |
| $\Delta S>0$ | 15:00~90:00 | B |
| $\Delta S>0$ | 15:00~45:00 | C |
| $\Delta S>0$ | 60:00~90:00 | A |
| $\Delta S>0$ | 30:00~60:00 | D |

FIG.13

| STRATEGY | PARAMETER CONDITION |
|---|---|
| A | ... |
| B | ... |
| C | ... |
| D | $P \geq 70$ (P: VALUE OF ENDURANCE PARAMETER) |

FIG.14

| STRATEGY | LENGTH OF TIME PERIOD OF IMPLEMENTATION (T) | PARAMETER CONDITION |
|---|---|---|
| A | ... | ... |
| B | ... | ... |
| C | ... | ... |
| D | $T \geq 30$ | $P > 70$ (P: VALUE OF ENDURANCE PARAMETER) |
| | $T < 30$ | $P > 50$ (P: VALUE OF ENDURANCE PARAMETER) |

FIG.15

| STRATEGY | FORMATION CONDITION |
|---|---|
| A | ... |
| B | ... |
| C | ... |
| D | ... |

FIG.16

| STRATEGY | PARAMETER CONDITION |
|---|---|
| A | ... |
| B | P<70<br>(P: VALUE OF DEFENSIVE-SKILL PARAMETER OF PLAYER CHARACTER IN OPPONENT TEAM, WHICH IS ASSIGNED TO POSITION IN VICINITY OF TOUCHLINE) |
| C | ... |
| D | ... |

FIG.17

| STRATEGY | FORMATION CONDITION |
|---|---|
| A | ... |
| B | ... |
| C | ... |
| D | ... |

GAME DEVICE, METHOD AND INFORMATION STORAGE MEDIUM FOR CONTROLLING GAME DEVICE BASED ON GAME SITUATIONS

CROSS-REFERENCE TO RELATED APPLICATION

The present application claims priority from Japanese application JP 2010-187689 filed on Aug. 24, 2010, the content of which is hereby incorporated by reference into this application.

BACKGROUND OF THE INVENTION

1. Field of the Invention

The present invention relates to a game device, a method of controlling a game device, and an information storage medium.

2. Description of the Related Art

A game in which actions of one or a plurality of game characters are controlled based on action control data is known. In a soccer game, for example, when a strategy such as "counterattack" is selected by a user, actions of player characters belonging to an operation subject team of the user are controlled based on action control data corresponding to the selected strategy. As a result, the player characters belonging to the operation subject team of the user implement the strategy selected by the user.

For example, in the soccer game described above, it is considered to allow the user to set up situations in which the strategy is to be implemented so that detailed directions can be given to the operation subject team as directions for the implementation of the strategy. If the aforementioned function is realized, the user can set up the situations in which "counter attack" is to be implemented so that "counter attack" is implemented when the operation subject team of the user is winning the game against an opponent team in a time period "15:00 to 45:00".

For realizing the function described above, a user interface which enables the user to relatively easily set up the situations in which the operation subject team of the user is to implement the strategy (specifically, the situations in which the actions of one or a plurality of game characters are to be controlled based on the action control data) is required to be realized.

SUMMARY OF THE INVENTION

The present invention has been made to solve the problem described above, and has an object to provide a game device capable of realizing a user interface which enables a user to relatively easily set up situations in which an action(s) of one or a plurality of game characters is(are) to be controlled based on action control data, and also to provide a method of controlling a game device, and an information storage medium.

In order to solve the above-mentioned problem, according to the present invention, there is provided a game device for implementing a game in which at least one game character acts, including: means for storing action control data for controlling an action of the at least one game character; display control means for controlling display means to display an image on which a first axis corresponding to first information about a situation of the game and a second axis corresponding to second information about a situation of the game are set; receiving means for receiving an operation of specifying one of a position and an area in the image; first-condition acquiring means for acquiring a first condition relating to the first information based on one of a position and a range on the first axis, corresponding to the one of the position and the area specified by the operation; second-condition acquiring means for acquiring a second condition relating to the second information based on one of a position and a range on the second axis, corresponding to the one of the position and the area specified by the operation; first determination means for determining whether or not the first information about a current situation of the game satisfies the first condition acquired by the first-condition acquiring means; second determination means for determining whether or not the second information about a current situation of the game satisfies the second condition acquired by the second-condition acquiring means; and game-character control means for controlling the action of the at least one game character based on the action control data in a case where results of the determinations by the first determination means and the second determination means are predetermined results.

Further, according to the present invention, there is provided a method of controlling a game device for implementing a game in which at least one game character acts, including: a step of acquiring action control data for controlling an action of the at least one game character, which is stored in means for storing the action control data; a display control step of controlling display means to display an image on which a first axis corresponding to first information about a situation of the game and a second axis corresponding to second information about a situation of the game are set; a receiving step of receiving an operation of specifying one of a position and an area in the image; a first-condition acquiring step of acquiring a first condition relating to the first information based on one of a position and a range on the first axis, corresponding to the one of the position and the area specified by the operation; a second-condition acquiring step of acquiring a second condition relating to the second information based on one of a position and a range on the second axis, corresponding to the one of the position and the area specified by the operation; a first determination step of determining whether or not the first information about a current situation of the game satisfies the first condition acquired in the first-condition acquiring step; a second determination step of determining whether or not the second information about a current situation of the game satisfies the second condition acquired in the second-condition acquiring step; and a game-character control step of controlling the action of the at least one game character based on the action control data in a case where results of the determinations in the first determination step and the second determination step are predetermined results.

Further, according to the present invention, there is provided a program for causing a computer to function as a game device for implementing a game in which at least one game character acts, the program further causing the computer to function as: means for acquiring action control data for controlling an action of the at least one game character, which is stored in means for storing the action control data; display control means for controlling display means to display an image on which a first axis corresponding to first information about a situation of the game and a second axis corresponding to second information about a situation of the game are set; receiving means for receiving an operation for specifying one of a position and an area in the image; first-condition acquiring means for acquiring a first condition relating to the first information based on one of a position and a range on the first axis corresponding to the one of the position and the area specified by the operation; second-condition acquiring means for acquiring a second condition relating to the second information based on one of a position and a range on the second axis corresponding to the one of the position and the area specified by the operation; first determination means for determining whether or not the first information about a current situation of the game satisfies the first condition acquired by the first-condition acquiring means; second determination means for determining whether or not the second information about a current situation of the game satisfies the second condition acquired by the second-condition acquiring means; and game-character control means for controlling the action of the at least one game character based on the action control data in a case where results of the determinations by the first determination means and the second determination means are predetermined results.

Further, an information storage medium according to the present invention is a computer-readable information storage medium having the above-mentioned program recorded thereon.

According to the present invention, the user interface enabling the user to relatively easily set up situations in which the action(s) of one or a plurality of game characters is(are) to be controlled based on the action control data can be realized.

Further, according to one aspect of the present invention, the game device may further include means for storing parameter data relating to at least one of an ability and a state of the at least one game character. The display control means may include: means for controlling the display means to display an image indicating the one of the position and the area specified by the operation; and means for controlling a display mode of the image indicating the one of the position and the area specified by the operation based on the parameter data.

Further, according to one aspect of the present invention, the game device may further include means for storing a parameter condition corresponding to a condition relating to the parameter data in association with the action control data. The display control means may include means for controlling the display mode of the image indicating the one of the position and the area specified by the operation based on the parameter data and the parameter condition, and may change the display mode of the image indicating the one of the position and the area specified by the operation between a case where the parameter data satisfies the parameter condition and a case where the parameter data does not satisfy the parameter condition.

Further, according to one aspect of the present invention, the game device may further include storage means for storing a range condition corresponding to a condition relating to a size of a range on the first axis and a parameter condition corresponding to a condition relating to the parameter data in association with each other. The display control means may include means for controlling the display mode of the image indicating the area specified by the operation based on the parameter data and a content stored in the storage means, and may change the display mode of the image indicating the area specified by the operation between a case where the parameter condition associated with the range condition satisfied by the size of the range on the first axis, corresponding to the area specified by the operation, is satisfied by the parameter data and a case where the parameter condition associated with the range condition satisfied by the size of the range on the first axis, corresponding to the area specified by the operation, is not satisfied by the parameter data.

Further, according to one aspect of the present invention, the game may be a game in which a plurality of the game characters act. The game device may further include means for storing a formation condition corresponding to a condition relating to a formation of the plurality of the game characters in association with the action control data. The display control means may include: means for controlling the display means to display the image indicating the one of the position and the area specified by the operation; and means for controlling a display mode of the image indicating the one of the position and the area specified by the operation based on the formation of the plurality of the game characters and the formation condition, and may change the display mode of the image indicating the one of the position and the area specified by the operation between a case where the formation of the plurality of the game characters satisfies the formation condition and a case where the formation of the plurality of the game characters does not satisfy the formation condition.

Further, according to one aspect of the present invention, the game may be a game in which at least one first game character and at least one second game character act. The action control data may include data for controlling an action of the at least one first game character. The game-character control means controls the action of the at least one first game character based on the action control data in a case where the results of the determinations by the first determination means and the second determination means are the predetermined results. The game device may further include: means for storing parameter data relating to at least one of an ability and a state of the at least one second game character; and means for storing a parameter condition corresponding to a condition relating to the parameter data in association with the action control data. The display control means may include: means for controlling the display means to display an image indicating the one of the position and the area specified by the operation; and means for controlling a display mode of the image indicating the one of the position and the area specified by the operation based on the parameter data and the parameter condition, and may change the display mode of the image indicating the one of the position and the area specified by the operation between a case where the parameter data satisfies the parameter condition and a case where the parameter data does not satisfy the parameter condition.

Further, according to one aspect of the present invention, the game may be a game in which a plurality of first game characters and a plurality of second game characters act. The action control data may include data for controlling actions of the plurality of first game characters. The game-character control means may control the actions of the plurality of first game characters based on the action control data in a case where the results of the determinations by the first determination means and the second determination means are the predetermined results. The game device may further include means for storing a formation condition corresponding to a condition relating to a formation of the plurality of second game characters in association with the action control data. The display control means may include: means for controlling the display means to display an image indicating the one of the position and the area specified by the operation; and means for controlling a display mode of the image indicating the one of the position and the area specified by the operation based on the formation of the plurality of second game characters and the formation condition, and may change the display mode of the image indicating the one of the position and the area specified by the operation between a case where the formation of the plurality of second game characters satisfies the formation condition and a case where the formation of the plurality of second game characters does not satisfy the formation condition.

BRIEF DESCRIPTION OF THE DRAWINGS

In the accompanying drawings:

FIG. 10 is a view illustrating an example of strategy data;

FIG. 13 is a view illustrating an example of data for controlling a display mode of a bar;

FIG. 14 is a view illustrating another example of the data for controlling the display mode of the bar;

FIG. 15 is a view illustrating a further example of the data for controlling the display mode of the bar;

FIG. 16 is a view illustrating a further example of the data for controlling the display mode of the bar; and FIG. 17 is a view illustrating a further example of the data for controlling the display mode of the bar.

DETAILED DESCRIPTION OF THE INVENTION

Hereinafter, detailed description is given of an example of an embodiment of the present invention with reference to the drawings. A game device according to an embodiment of the present invention is implemented by, for example, a consumer game machine (stationary game machine), a portable game machine, a mobile phone, a personal digital assistant (PDA), or a personal computer. Herein, description is given of a case in which the game device according to the embodiment of the present invention is implemented by a consumer game machine.

Figure 1:
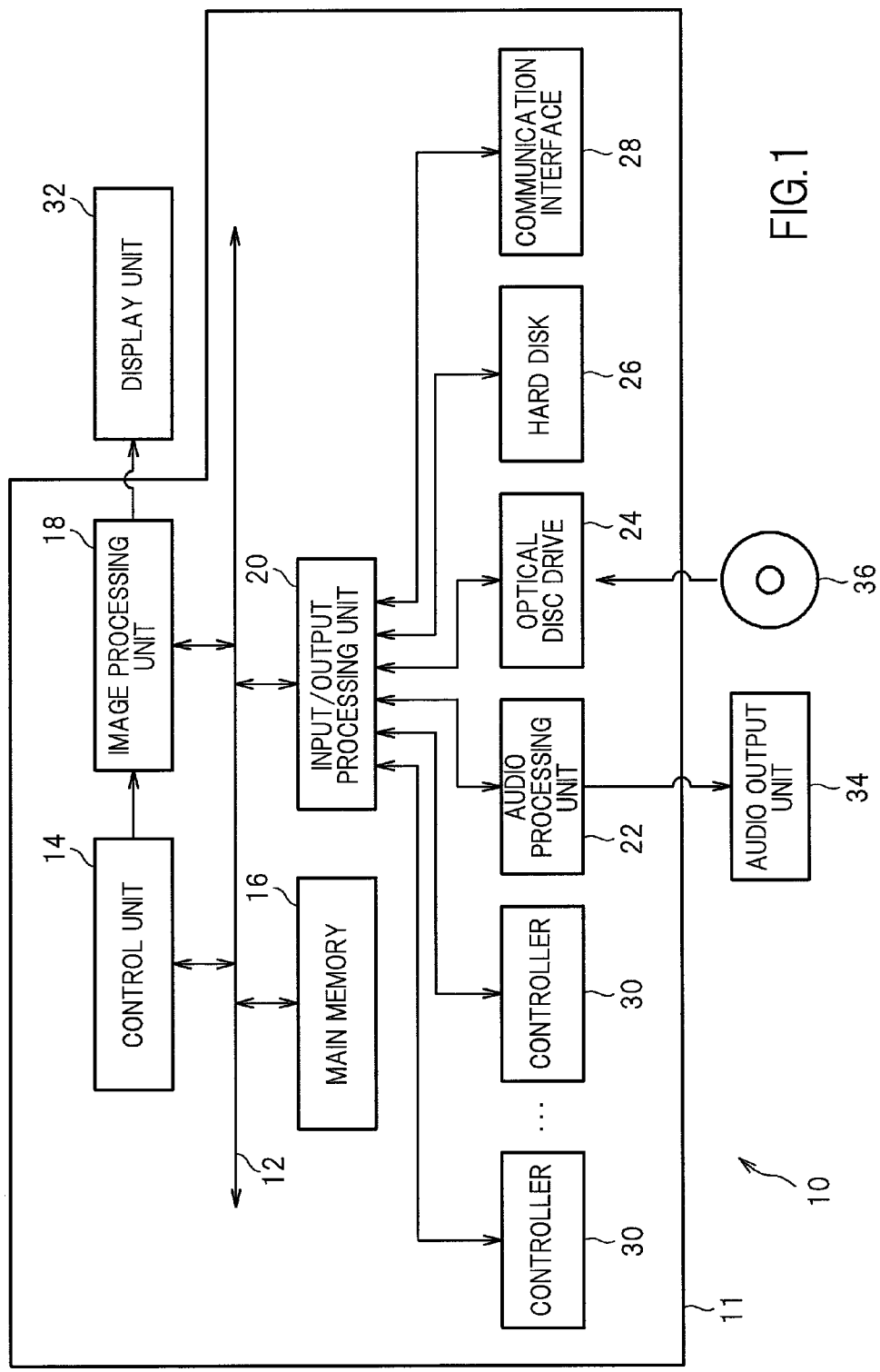
FIG. 1 is a diagram illustrating a hardware configuration of a game device according to an embodiment of the present invention.

FIG. 1 illustrates a hardware configuration of a game device according to this embodiment. As illustrated in FIG. 1, the game device 10 includes a consumer game machine 11, a display unit 32, an audio output unit 34, and an optical disc 36 (information storage medium). The display unit 32 and the audio output unit 34 are connected to the consumer game machine 11. The display unit 32 may be a display device such as a consumer television set or a liquid crystal display, for example. The audio output unit 34 may be an audio outputting device such as a speaker included in the consumer television set or headphones, for example.

The consumer game machine 11 is a known computer game system. The consumer game machine 11 includes a bus 12, a control unit 14, a main memory 16, an image processing unit 18, an input/output processing unit 20, an audio processing unit 22, an optical disc drive 24, a hard disk 26, a communication interface 28, and a controller 30.

The control unit 14 includes one or a plurality of microprocessors. The control unit 14 executes various types of control processing for components and information processing based on a program read from the optical disc 36. The main memory 16 includes, for example, a RAM. The program and data read from the optical disc 36 are written into the main memory 16. The main memory 16 is also used as a working memory for the control unit 14. The bus 12 is used for exchanging addresses and data among the components of the consumer game machine 11.

The image processing unit 18 includes a VRAM, and renders, based on image data supplied from the control unit 14, a screen in the VRAM. Then, the image processing unit 18 converts the screen rendered in the VRAM into video signals, and outputs the video signals to the display unit 32.

The input/output processing unit 20 is an interface for the control unit 14 to access the audio processing unit 22, the optical disc drive 24, the hard disk 26, the communication interface 28, and the controller 30. The audio processing unit 22 includes a sound buffer, and outputs, from the audio output unit 34, audio data that has been loaded from the optical disc 36 into the sound buffer. The communication interface 28 is an interface for connecting the consumer game machine 11 to a communication network such as the Internet by wire or wireless.

The optical disc drive 24 reads a program or data recorded on the optical disc 36. Herein, the optical disc 36 is used for supplying the program or the data to the consumer game machine 11. Alternatively, another information storage medium, such as a memory card, may be used. Alternatively, the program or the data may be supplied to the consumer game machine 11 from a remote place via a communication network, for example. The hard disk 26 is a commonly-used hard disk device (auxiliary storage device). The program or the data, which is supposed to be stored in the optical disc 36 in the following description, may be stored in the hard disk 26.

The controller 30 is an operation portion for a user to perform operations. A plurality of the controllers 30 may be connected to the consumer game machine 11 by wire or wireless. Each of the controllers 30 includes a plurality of operation members such as, for example, a plurality of buttons and a plurality of levers (sticks). The input/output processing unit 20 scans states of the operation members of the controller 30 at fixed intervals (for example, every $\frac{1}{60}^{th}$ of a second), and then transfers an operation signal indicating a result of the scanning to the control unit 14 via the bus 12. The control unit 14 makes a judgment on the user's game operation based on the operation signal.

In the game device 10, a game in which one or a plurality of game character(s) acts(act) is implemented by the program stored in the optical disc 36. For example, a game simulating a sport using a moving object (such as a ball or a puck, for example) is implemented.

Hereinafter, description is given for the case of executing a soccer game. In the soccer game, for example, a soccer match is executed between a team operated by the user (hereinafter, referred to as "user team") and a team operated by an opponent (hereinafter, referred to as "opponent team"). Specifically, in the soccer game, player characters belonging to the user team (first game characters) and player characters belonging to the opponent team (second game characters) play a soccer match. The opponent may be a computer or another user. Hereinafter, the case where the opponent is a computer is described.

Figure 2:
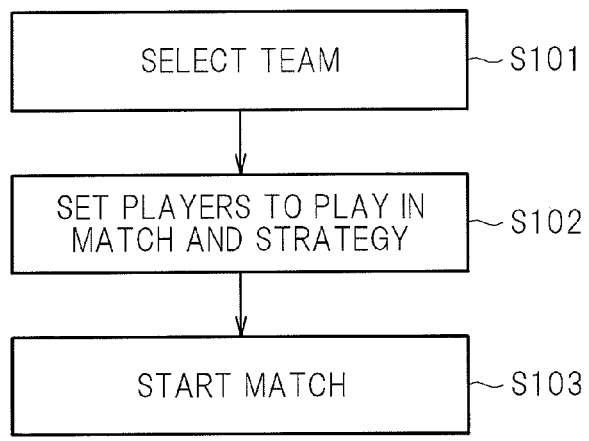
FIG. 2 is a flowchart illustrating an example of a flow of a soccer game.

First, a flow of a soccer game is described. FIG. 2 is a flowchart illustrating an example of the flow of the soccer game. As illustrated in FIG. 2, the user first selects any of a plurality of pre-prepared teams (S101). The team selected in this step is an operation subject team of the user (specifically, user team).

After the selection of the team, the user sets the players of the user team to play in the match and a game plan (S102). For example, the user selects any of a plurality of pre-prepared formations to set a formation of the user team. Herein, the "formation" means basic arrangement (basic formation) of the player characters belonging to the team. As the formations selectable by the user, for example, there are formations such as "4-3-3" and "4-4-2". For example, the "4-3-3" formation is made up of a goalkeeper (GK), four defenders (DFs), three midfielders (MFs), and three forwards (FWs).

The user also selects player characters to play in the match from the player characters belonging to the user team. Specifically, the user selects the player characters to be assigned to the respective positions (GK, DFs, MFs, and FWs) in the formation.

Further, the user selects a strategy to be implemented by the user team. The user also sets a time period and a match situation in which the selected strategy is to be implemented. As the types of strategies selectable by the user, for example, the following strategies are given. However, the types of strategies selectable by the user are not limited to those described below:

[A] Counter Attack;
[B] Side Attack;
[C] Attack in the Middle; and
[D] Zone press.

Figure 3:
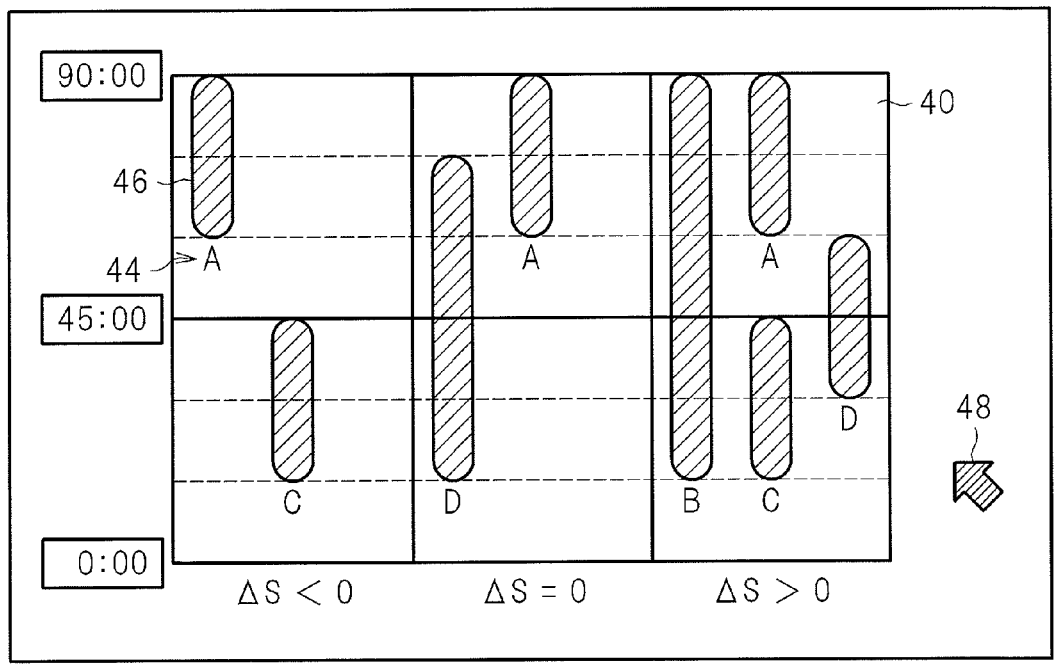
FIG. 3 is a view illustrating an example of a strategy screen.

In this embodiment, a user interface, which enables the user to relatively easily perform setting relating to the strategies, is realized. FIG. 3 illustrates an example of a screen for performing setting relating to the strategies (hereinafter, referred to as "strategy screen").

Figure 4:
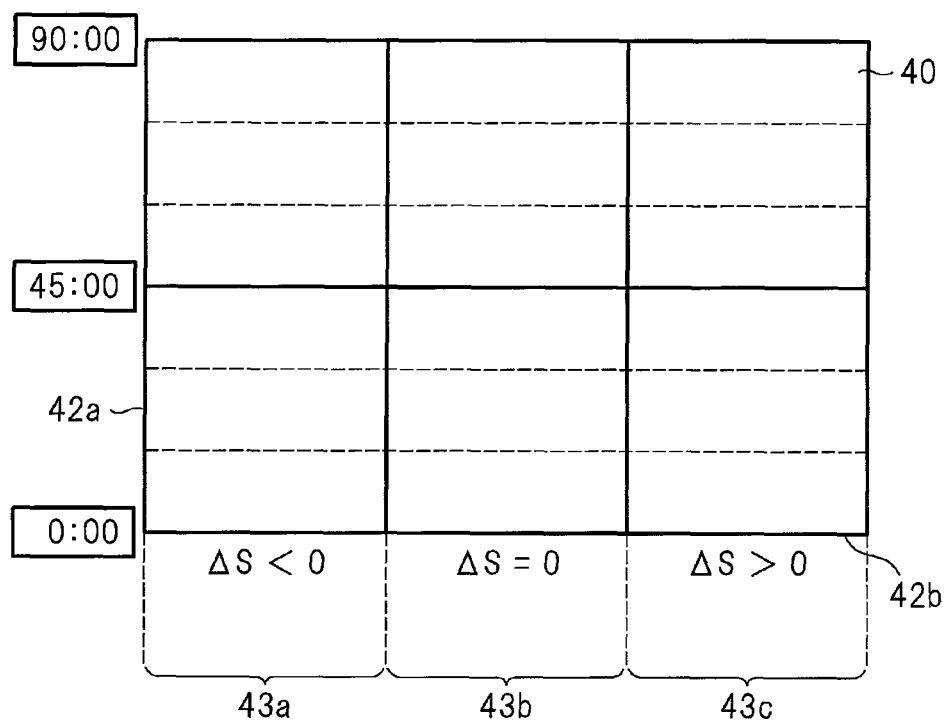
FIG. 4 is a view for illustrating an underlying image.

The strategy screen illustrated in FIG. 3 contains an underlying image 40. FIG. 4 is a view for illustrating the underlying image 40. As illustrated in FIG. 4, on the underlying image 40, a first axis 42a extending in a first direction (longitudinal direction) and a second axis 42b extending in a second direction (horizontal direction) are set. The first axis 42a and the second axis 42b perpendicularly cross each other.

The first axis 42a relates to elapsed time of the match. In the soccer game of this embodiment, the match basically consists of a first half and a second half as in the case of actual soccer matches. A time period "0:00 to 45:00" corresponds to the first half, whereas a time period "45:00 to 90:00" corresponds to the second half. The first axis 42a is associated with a time period "0:00 to 90:00".

The second axis 42b relates to a score situation. In the example illustrated in FIG. 4, the second axis 42b relates to a score difference between the user team and the opponent team. The symbol "ΔS" illustrated in FIGS. 3 and 4 indicates a score difference between the user team and the opponent team. When a score of the user team is higher than that of the opponent team, "ΔS" has a positive value. On the other hand, when the score of the user team is lower than that of the opponent team, "ΔS" has a negative value.

Therefore, "ΔS<0" indicates a situation in which the score of the user team is lower than that of the opponent team, specifically, the opponent team is winning the match against the user team. On the other hand, "ΔS=0" indicates a situation in which the user team and the opponent team tie the score, and "ΔS>0" indicates a situation in which the score of the user team is higher than that of the opponent team, specifically, the user team is winning the match against the opponent team.

A plurality of ranges 43a, 43b, and 43c are set for the second axis 42b. The different score situations (score differences) are respectively associated with the ranges 43a, 43b, and 43c. Specifically, "ΔS<0" is associated with the range 43a as the score situation, "ΔS=0" is associated with the range 43b as the score situation, and "ΔS>0" is associated with the range 43c as the score situation.

As illustrated in FIG. 3, a strategy ID 44 and a bar 46 are displayed on the underlying image 40 in association with each other. The strategy ID 44 is information for identifying the strategy. In the example illustrated in FIG. 3, "A", "B", "C", and "D" are illustrated as the strategy IDs 44. Alternatively, a strategy name such as, for example, "side attack" may be displayed in place of the strategy ID 44.

The bar 46 indicates a time period and a score situation (score difference) in which the strategy identified by the strategy ID 44 is to be implemented. Specifically, the bar 46 indicates that the strategy identified by the strategy ID 44 is implemented when the score difference between the two teams becomes equal to the score difference indicated by the bar 46 within the time period indicated by the bar 46.

A cursor 48 is displayed on the strategy screen. The cursor 48 moves according to an operation performed by the user. The cursor 48 is used for the setting of the strategy.

A procedure for setting the strategy is now described. Here, a procedure for setting the strategy with the strategy ID "B" (side attack) so that the strategy is implemented within the time period "45:00 to 75:00" when the user team and the opponent team are tied is described. Hereinafter, the strategy with the strategy ID "B" is referred to as "strategy "B"".

Figure 5:
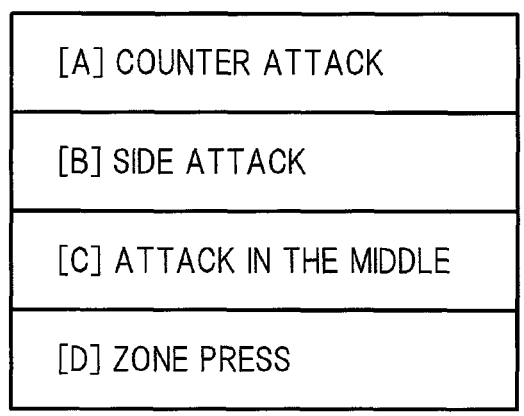
FIG. 5 is a view illustrating an example of a strategy menu.

In this case, the user first presses a predetermined button to display a strategy menu. FIG. 5 is a view illustrating an example of the strategy menu. On the strategy menu, a list of strategies selectable by the user is displayed. The user selects the strategy "B" on the strategy menu.

Thereafter, the user moves the cursor 48 to a position corresponding to elapsed time "45:00" within an area corresponding to the range 43b associated with the score situation "ΔS=0". In this state, the user performs an operation of determining a start point. The operation of determining the start point is, for example, an operation of pressing a predetermined button. Thereafter, the user moves the cursor 48 to a position corresponding to elapsed time "75:00" within an area corresponding to the range 43b associated with the score situation "ΔS=0". In this state, the user performs an operation of determining an end point. The operation of determining the end point is, for example, an operation of pressing a predetermined button.

Figure 6:
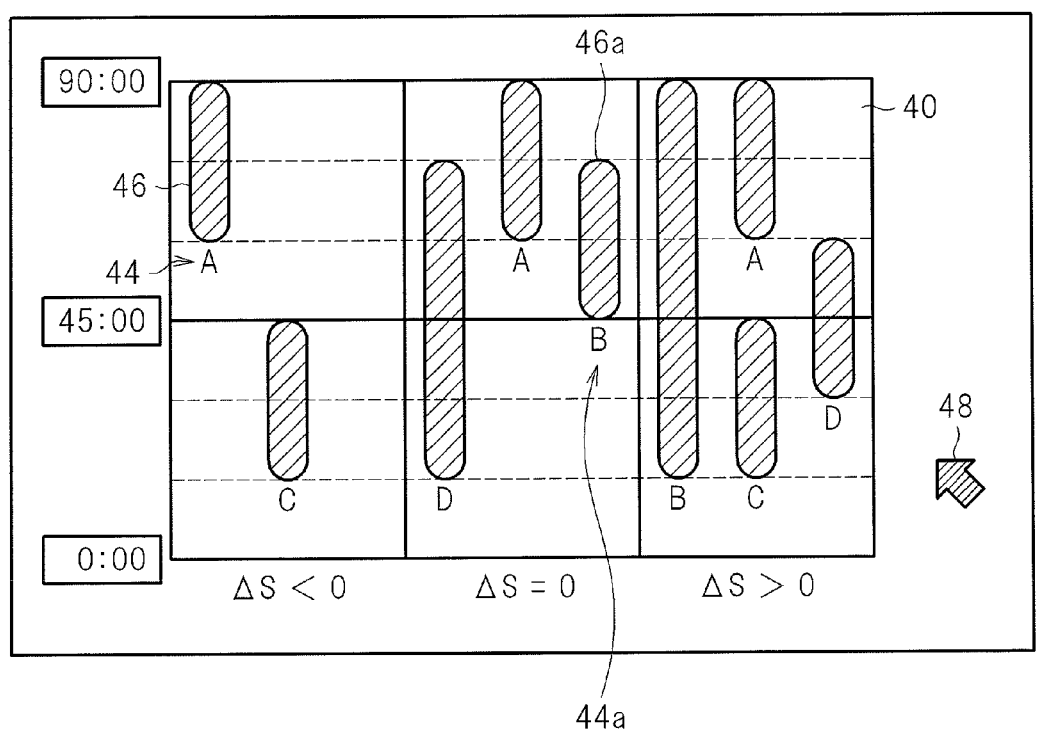
FIG. 6 is another view illustrating the example of the strategy screen.

After the execution of the procedure described above, the strategy ID 44 and the bar 46, which correspond to the contents of setting by the user, are additionally displayed. FIG. 6 illustrates an example of the strategy screen in the aforementioned case. In FIG. 6, a strategy ID 44a and a bar 46a respectively correspond to the strategy ID 44 and the bar 46 which are additionally displayed.

As described above, in the game device 10, the user can set situations (time period and score situation) in which the strategy is to be implemented, by a relatively simple operation of drawing the bar 46 on the underlying image 40.

When the setting of the players to play in the match and the game plan of the user team is completed, the match is started as illustrated in FIG. 2 (S103). Even after the start of the match, a substitution of a player to play in the match or a change of the game plan (strategy) can be performed.

Figure 7:
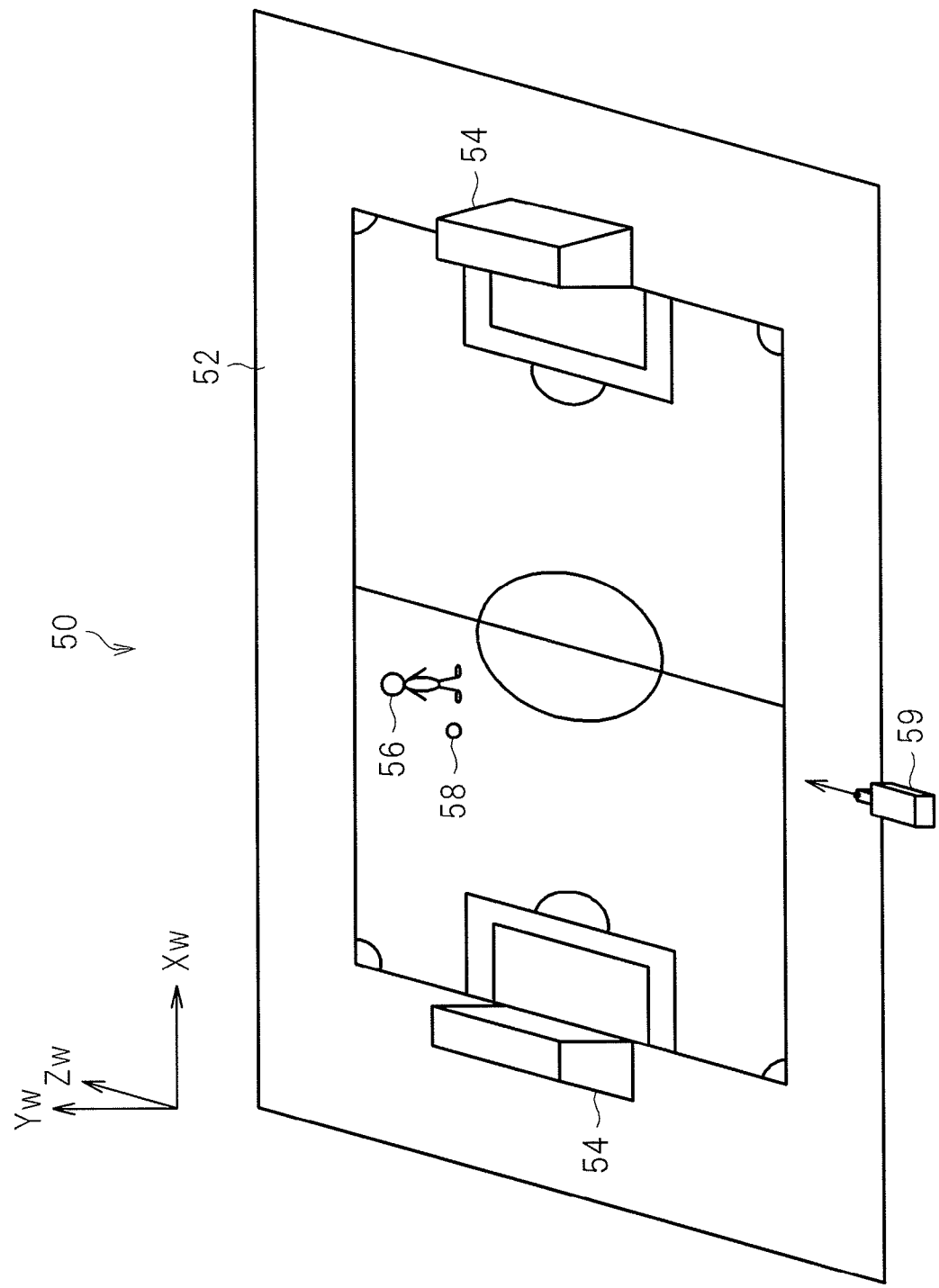
FIG. 7 is a view illustrating an example of a game space.

To start the match, a game space is built in the main memory 16. FIG. 7 illustrates an example of the game space. A game space 50 illustrated in FIG. 7 is a virtual three-dimensional space in which three coordinate axes (an Xw-axis, a Yw-axis, and a Zw-axis) which perpendicularly cross each other are set. The position and the like of an object disposed in the game space 50 is specified by the three coordinate axes.

As illustrated in FIG. 7, in the game space 50, a field 52 corresponding to an object representing a soccer field is disposed. On the field 52, there are disposed goals 54, which are objects representing soccer goals, a player character 56, which is an object representing a soccer player, and a ball 58, which is an object representing a soccer ball. Eleven player characters 56 belonging to the user team and another eleven player characters 56 belonging to the opponent team are disposed on the field 52, although illustration thereof is omitted in FIG. 7.

One of the goals 54 is associated with the user team, whereas the other one of the goals 54 is associated with the opponent team. When the ball 58 moves into the goal 54 associated with any one of the teams, a scoring event occurs for the other one of the teams.

When a player character 56 and the ball 58 come close to each other, the player character 56 and the ball 58 become associated with each other under a predetermined condition. In this case, the moving action of the player character 56 becomes a dribbling action. The state in which the ball 58 is associated with the player character 56 is hereinafter referred to as a state in which "the player character 56 is in possession of the ball 58".

In addition, in the game space 50, a virtual camera 59 (viewpoint) is set. A game screen illustrating a situation of the game space 50, which is viewed from the virtual camera 59, is displayed on the display unit 32. For example, in order to constantly display the ball 58 on the game screen, the virtual camera 59 moves around according to the position of the ball 58.

Figure 8:
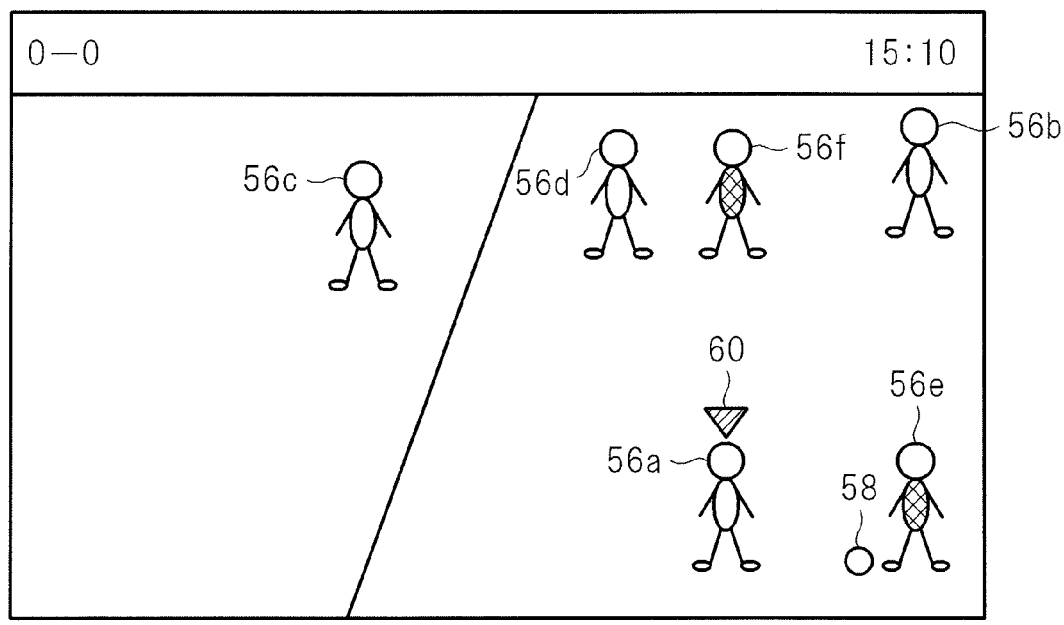
FIG. 8 is a view illustrating an example of a game screen.

FIG. 8 illustrates an example of the game screen during the match. On the game screen illustrated in FIG. 8, six player characters 56a, 56b, 56c, 56d, 56e, and 56f are displayed. Among the six player characters, four player characters 56a to 56d are the player characters 56 belonging to the user team. The remaining two player characters 56e and 56f are the player characters 56 belonging to the opponent team.

In the soccer game, any of the player characters 56 belonging to the user team is set as an operation subject of the user. The operation subject of the user is switched between the player characters 56 belonging to the user team. The operation subject of the user may be fixed to one of the player characters 56.

On the game screen illustrated in FIG. 8, a cursor 60 is displayed above a head of the player character 56a. The cursor 60 functions to guide the player character 56 set as the operation subject of the user.

The player character 56 set as the operation subject of the user acts based on the operation of the user. On the other hand, the player characters 56 which are not set as the operation subject of the user among the player characters 56 belonging to the user team (hereinafter, referred to as "teammate player characters") act autonomously according to artificial intelligence (AI). For example, in the case where the situations (time period and score situation) in which the strategy is to be implemented are set as illustrated in FIG. 6, under the situation in which the opponent team is winning the match against the user team in the time period "60:00 to 90:00", the teammate player characters act according to AI corresponding to the strategy "A". As a result, the teammate player characters implement the strategy "A".

As described above, in the game device 10, the user interface which enables the user to relatively easily set the situations (time period and score situation) in which the strategy is to be implemented is realized. Hereinafter, a configuration for realizing the user interface described above is described.

Figure 9:
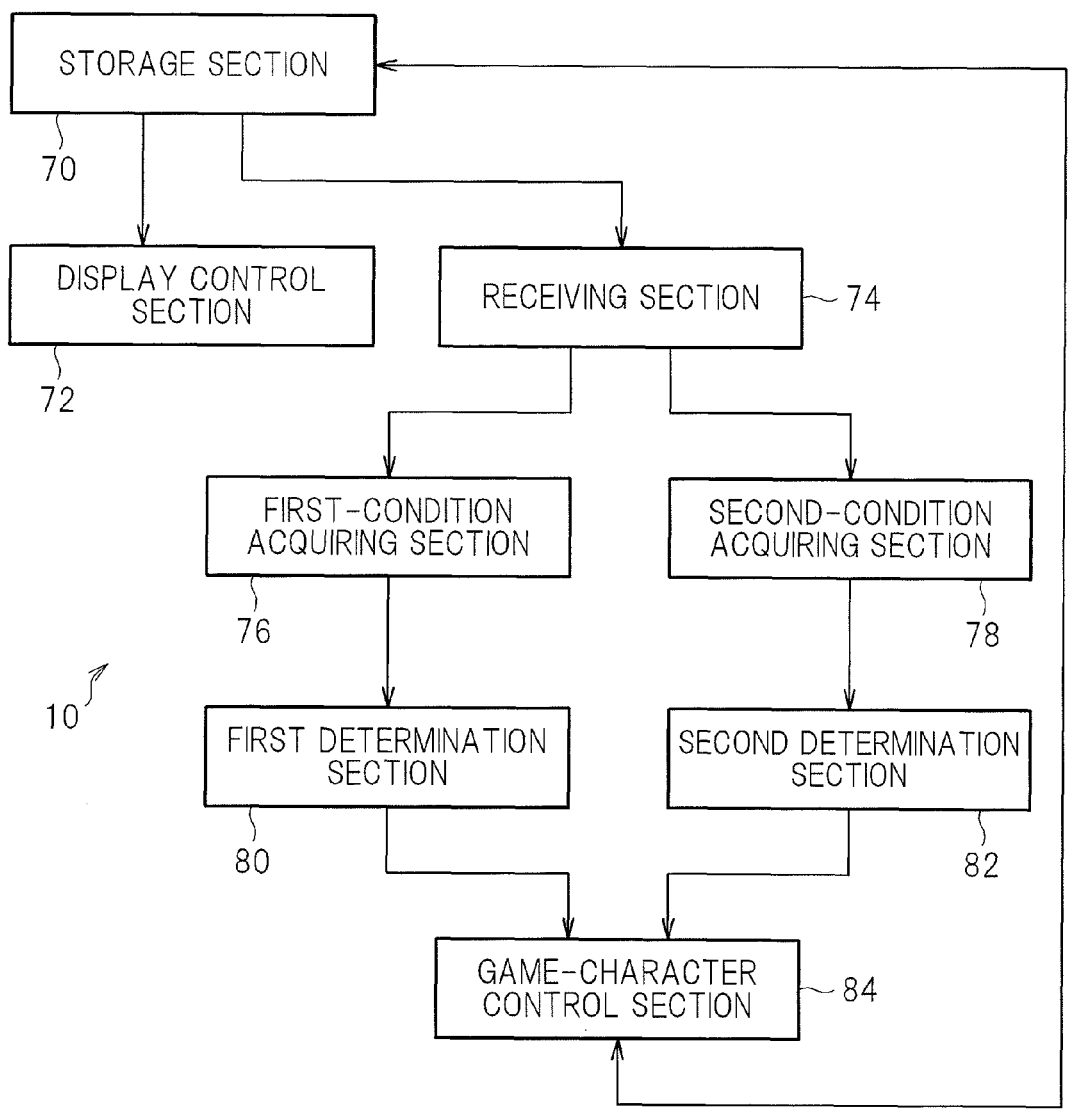
FIG. 9 is a functional block diagram of the game device according to the embodiment of the present invention.

FIG. 9 is a functional block diagram illustrating functions implemented in the game device 10. As illustrated in FIG. 9, the game device 10 includes a storage section 70, a display control section 72, a receiving section 74, a first-condition acquiring section 76, a second-condition acquiring section 78, a first determination section 80, a second determination section 82, and a game-character control section 84. The storage section 70 is implemented by, for example, the main memory 16 and the optical disc 36, whereas the other functional blocks are implemented by the control unit 14 executing the program read from the optical disc 36.

The storage section 70 stores data necessary for the implementation of the game. For example, model data of each object disposed in the game space and motion data of the game character are stored in the storage section 70. Moreover, for example, action control data for controlling the actions of the game character and parameter data relating to an ability and/or a state of the game character are also stored in the storage section 70.

In this embodiment, the model data of each object disposed in the game space 50 and the motion data of the player character 56 are stored in the storage section 70. Further, the storage section 70 contains the following kinds of data.
[1] User team data
[2] Opponent team data
[3] Action control data (AI)
[4] Game situation data The user team data relates to data concerning the user team. For example, the user team data contains the following kinds of data.
[1-1] Ability parameter data
[1-2] Formation data
[1-3] Strategy data For example, the ability parameter data includes data indicating values of ability parameters of each of the player characters 56 belonging to the user team. The ability parameter indicates an ability level as a numerical value ranging, for example, from "0" to "100". As the ability parameter, there are a running-ability parameter, an endurance parameter, a passing-ability parameter, and a shooting-ability parameter. Although the description is given assuming that the ability parameters are set for each of the player characters 56, the ability parameters may be set for the entire user team.

The formation data indicates the formation determined by the user in Step S102 of FIG. 2. The strategy data is data indicating which strategy is to be implemented in which time period and in which score situation. The above-mentioned items are set on the strategy screen. Therefore, the strategy data is data for retaining the contents set on the strategy screen.

FIG. 10 illustrates an example of the strategy data. The strategy data illustrated in FIG. 10 contains "score situation", "time period", and "strategy" fields. The "score situation" field indicates a score situation. The symbol "ΔS" in the "score situation" field indicates a score difference between the user team and the opponent team as in the case of FIG. 3. The "time period" field indicates a time period during the match. The "strategy" field indicates information for identifying the strategy (strategy ID). The letters "A", "B", "C", and "D" in the "strategy" field are the strategy IDs as in the case of FIG. 3.

The opponent team data is data concerning the opponent team. Similarly to the user team data, the opponent team data includes ability parameter data relating to an ability of each of the player characters 56 belonging to the opponent team and formation data indicating the formation of the opponent team.

The action control data is data for controlling the actions of the teammate player characters. For example, the action control data is prepared for each type of strategy (for example, counter attack, side attack, attack in the middle, or zone press). For example, the action control data corresponding to "counter attack" is data for controlling the actions of the teammate player characters so as to implement "counter attack". The action control data is, for example, artificial intelligence (AI).

The game situation data is data indicating the current situation of the game. For example, the game situation data contains the following kinds of data.

[4-1] State data of each player character 56 (position, moving direction, moving speed, and the like)
[4-2] State data of the ball 58 (position, moving direction, moving speed, and the like)
[4-3] State data of the virtual camera 59 (position, line of sight direction, angle of view, and the like)
[4-4] Score data indicating the score situation of both teams
[4-5] Elapsed time data indicating the elapsed time since the start of the game.

The state data of each of the player characters 56 includes data indicating whether or not the player character 56 is set as the operation subject of the user and data indicating whether or not the player character 56 is in possession of the ball 58.

Further, the state data of each of the player characters 56 includes state parameter data relating to the state of the player character 56. As a state parameter, there is a stamina parameter, for example. The stamina parameter has a numerical value ranging, for example, from "0" to "100". As the value of the stamina parameter becomes higher, the remaining stamina of the player character 56 is higher. For example, an initial value of the stamina parameter is set to "100". The value of the stamina parameter decreases based on the elapse of time and/or the actions of the player character 56. As the value of the stamina parameter becomes smaller, a action ability (for example, a moving speed or reaction speed) of the player character 56 is lowered.

Alternatively, a fatigue-degree parameter indicating a fatigue degree of the player character 56 may be stored in place of the stamina parameter. A value of the fatigue-degree parameter increases based on the elapse of time and/or the actions of the player character 56. In this case, when the value of the fatigue-degree parameter increases, the action ability (for example, the moving speed or reaction speed) of the player character 56 is lowered.

The game situation data may include data indicating a ball possession rate of each of the user team and the opponent team, data indicating the number of corner kicks and the number of shots of each of the user team and the opponent team, and data indicating the number of yellow cards and red cards issued to each of the user team and the opponent team.

The display control section 72 controls the display unit 32 to display the image on which the first axis and the second axis are set. The first axis corresponds to first information about a situation of the game, whereas the second axis corresponds to second information about a situation of the game. The "first information" or the "second information" is information about the game situation. For example, such information as described below may correspond to the "first information" or the "second information": information about a time period in the game; information about the progress of the game; information about the match situation; and information about situations of the game space.

The "information about the match situation" is, for example, information about the score situation or a moving-object possession rate in the game simulating a sport (such as soccer) using the moving object. For example, the "information about the situations of the game space" is information about the situation of disposition of the game characters disposed in the game space.

In this embodiment, the display control section 72 controls the display unit 32 to display the strategy image illustrated in, for example, FIG. 3. As described above, the underlying image 40 in which the first axis 42a and the second axis 42b are set is displayed on the strategy screen. In this embodiment, the underlying image 40 corresponds to the "image on which the first axis corresponding to the first information about the situation of the game and the second axis corresponding to the second information about the situation of the game are set".

The first axis 42a set in the underlying image 40 corresponds to elapsed time during the match (in other words, the time period in the match). Specifically, the elapsed time in the match corresponds to the "first information". On the other hand, the second axis 42b corresponds to the score situation, more specifically, the score difference (ΔS) between the user team and the opponent team. Specifically, the information about the score situation corresponds to the "second information".

Alternatively, the score situation (score difference) maybe associated with the first axis 42a, whereas the elapsed time in the match may be associated with the second axis 42b. Information (information about the game situations) other than that about the elapsed time or the score situation in the match may be associated with each of the first axis 42a and the second axis 42b. For example, in place of the score situation, the ball possession rate may be associated with the second axis 42b.

The receiving section 74 receives an operation of specifying a position or an area in the image on which the first axis corresponding to the first information about the game situation and the second corresponding to the second information about the game situation are set. For example, the receiving section 74 receives an operation of drawing an image indicating the position or the area in the image described above.

In this embodiment, the receiving section 74 receives an operation of selecting any strategy (action control data) from the selection menu. The receiving section 74 also receives an operation of specifying an area in the underlying image 40 as an operation of specifying situations (time period and score difference) in which the strategy is to be implemented. More specifically, the receiving section 74 receives an operation of drawing the bar 46 indicating the area in the underlying image 40. In this embodiment, the bar 46 corresponds to the "image indicating the area in the image on which the first axis corresponding to the first information about the situation of the game and the second axis corresponding to the second information about the situation of the game are set".

The first-condition acquiring section 76 acquires a first condition relating to the first information based on a position or a range on the first axis, which corresponds to the position or the area specified by the operation received by the receiving section 74.

As described above, in this embodiment, the elapsed time (first information) in the match is associated with the first axis 42a set in the underlying image 40. The first-condition acquiring section 76 acquires the range of elapsed time corresponding to the range on the first axis 42a, which is indicated by the bar 46, as the "first condition". Specifically, the time period indicated by the range on the first axis 42a, which corresponds to the bar 46, is acquired as the "first condition". For example, in the case where the bar 46a illustrated in FIG. 6 is drawn by the user, the time period "45:00 to 75:00" is acquired as the "first condition".

On the other hand, the second-condition acquiring section 78 acquires a second condition relating to the second information based on a position or a range on the second axis, which corresponds to the position or the area specified by the operation received by the receiving section 74.

As described above, in this embodiment, the score difference (second information) is associated with each of the plurality of ranges 43a to 43c of the second axis 42b set on the underlying image 40. The second-condition acquiring section 78 acquires, as the "second condition", the score difference associated with the range corresponding to the position at which the bar 46 is drawn, among the ranges 43a to 43c. For example, in the case where the bar 46a illustrated in FIG. 6 is drawn by the user, the score difference (ΔS=0) associated with the range 43b corresponding to the position at which the bar 46a is drawn is acquired as the "second condition".

In this embodiment, for the strategy selected by the user, the "first condition" and the "second condition" are acquired. For example, when the bar 46a illustrated in FIG. 6 is drawn by the user for the strategy "B", the time period "45:00 to 75:00" and the score difference "ΔS=0" are acquired respectively as the "first condition" and the "second condition" for the strategy "B". The results of acquisition by the first-condition acquiring section 76 and the second-condition acquiring section 78 are stored as the strategy data.

As described below, the "first condition" and the "second condition" are conditions to be satisfied so that the user team (teammate player characters) implements the strategy selected by the user. In other words, the "first condition" and the "second condition" indicate the situations (time period and score difference) in which the strategy selected by the user is to be implemented.

The first determination section 80 determines whether or not the first information about a current game situation satisfies the first condition acquired by the first-condition acquiring section 76 during the game. In this embodiment, the time period in the game is acquired as the "first condition". Therefore, the first determination section 80 determines whether or not a current time point is contained in the time period acquired as the "first condition".

The second determination section 82 determines whether or not the second information about a current game situation satisfies the second condition acquired by the second-condition acquiring section 78 during the game. In this embodiment, the score difference is acquired as the "second condition". Therefore, the second determination section 82 determines whether or not the score difference between the two teams at a current time point is the score difference acquired as the "second condition".

The game-character control section 84 controls the actions of one or a plurality of game characters based on the action control data when the results of determinations by the first determination section 80 and the second determination section 82 are predetermined results during the game.

In this embodiment, the teammate player characters correspond to the "game characters". For example, in the case where the time period "45:00 to 75:00" and the score difference "ΔS=0" are acquired respectively as the "first condition" and the "second condition" for the strategy "B", the game-character control section 84 controls the actions of the teammate player characters according to AI (action control data) corresponding to the strategy "B" when the score difference between the two team is "ΔS=0" in the time period "45:00 to 75:00". In this case, the teammate player characters implement the strategy "B".

Figure 11:
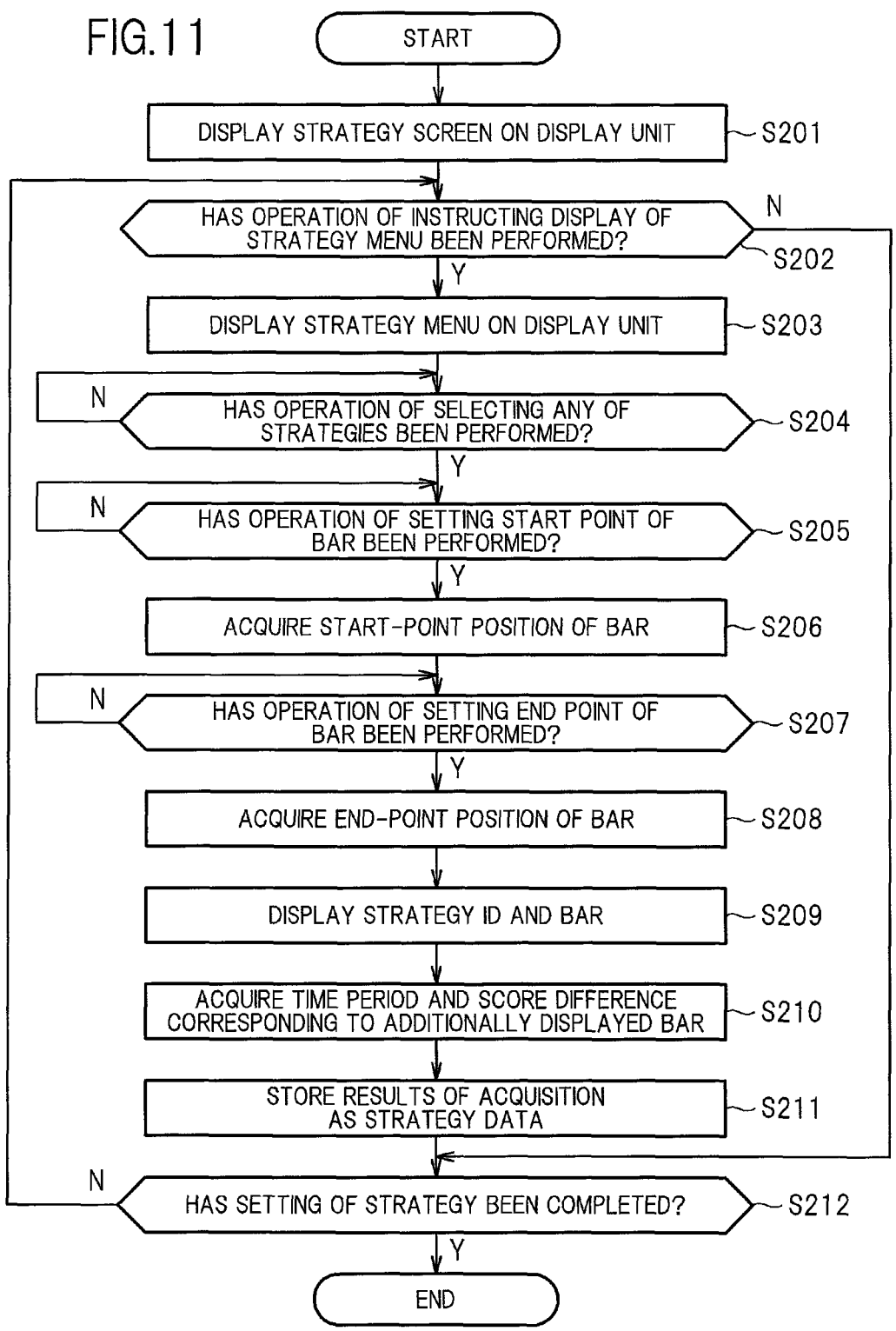
FIG. 11 is a flowchart illustrating an example of processing performed by the game device.

Next, processing performed in the game device 10 for implementing the above-mentioned functional blocks is described. FIG. 11 is a flowchart illustrating the processing performed in the game device 10, for setting the strategy in Step S102 of FIG. 2. The control unit 14 performs the processing illustrated in FIG. 11 according to the program read out from the optical disc 36. By performing the processing illustrated in FIG. 11, the display control section 72, the receiving section 74, the first-condition acquiring section 76, and the second-condition acquiring section 78 are implemented.

As illustrated in FIG. 11, the control unit 14 (display control section 72) displays the strategy screen on the display section 32 (S201). For example, the control unit 14 draws the underlying image 40 on the VRAM. Thereafter, the control unit 14 draws the strategy ID 44 and the bar 46 on the underlying image 40 drawn on the VRAM. Positions at which the strategy ID 44 and the bar 46 are drawn are determined based on the strategy data. The created image formed on the VRAM in the above-mentioned manner is displayed on the display section 32.

While the strategy screen is displayed, processing (S202 to S212) described below is performed. In practice, processing for moving the cursor 48 according to the operation of the user is performed in parallel to the processing (S202 to S212) described below. However, the illustration thereof is omitted in FIG. 11.

When the strategy screen is displayed, the control unit 14 determines whether or not the operation of instructing the display of the strategy menu has been performed (S202). The "operation of instructing the display of the strategy menu" is, for example, an operation of pressing a predetermined button provided on the controller 30. Whether or not the predetermined button has been pressed is determined based on an operation signal fed from the controller 30.

When the operation of instructing the display of the strategy menu has not been performed, the control unit 14 performs processing in Step S212 described below. On the other hand, when the operation of instructing the display of the strategy menu has been performed, the control unit 14 displays the strategy menu on the display unit 32 (S203).

When the strategy menu is displayed, the control unit 14 then determines whether or not an operation of selecting any strategy has been performed (S204). Whether or not the operation of selecting any strategy has been performed is determined based on an operation signal fed from the controller 30.

When the operation of selecting any strategy has not been performed, the control unit 14 continues monitoring whether or not the operation of selecting any strategy has been performed. On the other hand, when the operation of selecting any strategy has been performed, the control unit 14 identifies the strategy selected by the user and then receives an operation of setting situations (time period and score difference) in which the strategy selected by the user is to be implemented (S205 to S209). Specifically, the control unit 14 receives an operation of drawing the bar 46 on the underlying image 40.

Specifically, the control unit 14 (receiving section 74) determines whether or not an operation of setting the start point of the bar 46 has been performed (S205). The "operation of setting the start point of the bar 46" is an operation of pressing a predetermined button provided to the controller 30. The "predetermined button" in this case may be the same button as that used for the "operation of instructing the display of the strategy menu" in Step S202 or may be a different button.

When the operation of setting the start point of the bar 46 has not been performed, the control unit 14 continues monitoring whether or not the operation of setting the start point of the bar 46 has been performed (S205). On the other hand, when the operation of setting the start point of the bar 46 has been performed, the control unit 14 acquires a current position of the cursor 48 at the time of implementation of the operation as a start-point position of the bar 46 (S206).

After the start-point position of the bar 46 is acquired, the control unit 14 (receiving section 74) determines whether or not an operation of setting the endpoint of the bar 46 has been performed (S207). The "operation of setting the end point of the bar 46" is an operation of pressing a predetermined button provided on the controller 30. The "predetermined button" in this case may be the same button as that used for the "operation of setting the start point of the bar 46", or may be a different button. Alternatively, the "operation of setting the start point of the bar 46" performed in Step S205 may be an operation of pressing the predetermined button, whereas the "operation of setting the end point of the bar 46" performed in Step S207 may be an operation of releasing the depression of the predetermined button.

Until the operation of setting the end point of the bar 46 is performed, the temporary bar 46 having the start-point position obtained in Step S206 and the current position of the cursor 48 as both ends may be displayed.

When the operation of setting the end point of the bar 46 has not been performed, the control unit 14 continues monitoring whether or not the operation of setting the end point of the bar 46 has been performed (S207). On the other hand, the operation of setting the end point of the bar 46 has been performed, the control unit 14 acquires a current position of the cursor 48 at the time of implementation of the operation as an end-point position of the bar 46 (S208).

After the end-point position of the bar 46 is acquired, the control unit 14 (display control section 72) additionally displays the strategy ID 44 and the bar 46 on the underlying image 40 (S209). In this case, the bar 46 having the start-point position acquired in Step S206 and the end-point position acquired in Step S208 as both ends is additionally displayed based on the start-point position and the end-point position. Further, below the bar 46, the strategy ID 44 of the strategy which is determined in Step S204 as being selected by the user from the strategy menu is additionally displayed.

Further, the control unit 14 (first-condition acquiring section 76 and second-condition acquiring section 78) acquires the time period and the score difference corresponding to the bar 46 which is additionally displayed in Step S209 (S210). For example, the control unit 14 acquires a period between a time point corresponding to the start-point position acquired in Step S206 and a time point corresponding to the end-point position acquired in Step S208 as a time period corresponding to the bar 46 which is additionally displayed in Step S209. Moreover, the control unit 14 determines to which of the ranges 43a to 43c, the position on the second axis 42b, which corresponds to the bar 46 additionally displayed in Step S209, belongs. Specifically, the control unit 14 determines to which of the ranges 43a to 43b, a foot of a perpendicular extended from the start-point position acquired in Step S206 or the end-point position acquired in Step S208 to the second axis 42b belongs. Then, the control unit 14 acquires the score difference associated with the range.

After the time period and the score difference, which correspond to the bar 46 additionally displayed in Step S209, are acquired, the control unit 14 stores the results of acquisition as the strategy data (S211). Specifically, the control unit 14 stores a combination of the strategy ID of the strategy determined in Step S204 as being selected by the user from the strategy menu, the time period acquired in Step S210, and the score difference acquired in Step S210, as the strategy data.

In Step S211, a new record is added to the strategy data. Then, in a "score difference" field of the added record, the score difference acquired in Step S210 is stored. Moreover, in a "time period" field of the added record, the time period acquired in Step S210 is stored. Further, in a "strategy" field of the added record, the strategy ID of the strategy determined in Step S204 as being selected by the user from the strategy menu is stored.

After the processing in Step S211 is performed, the control unit 14 determines whether or not the setting of the strategy has been completed (S212). For example, the control unit 14 determines whether or not an operation for completing the setting of the strategy has been performed. When the operation for completing the setting of the strategy has been performed, the control unit 14 determines that the setting of the strategy has been completed and terminates the processing. On the other hand, when the setting of the strategy has not been completed, the control unit 14 performs the processing in Step S202 again.

Figure 12:
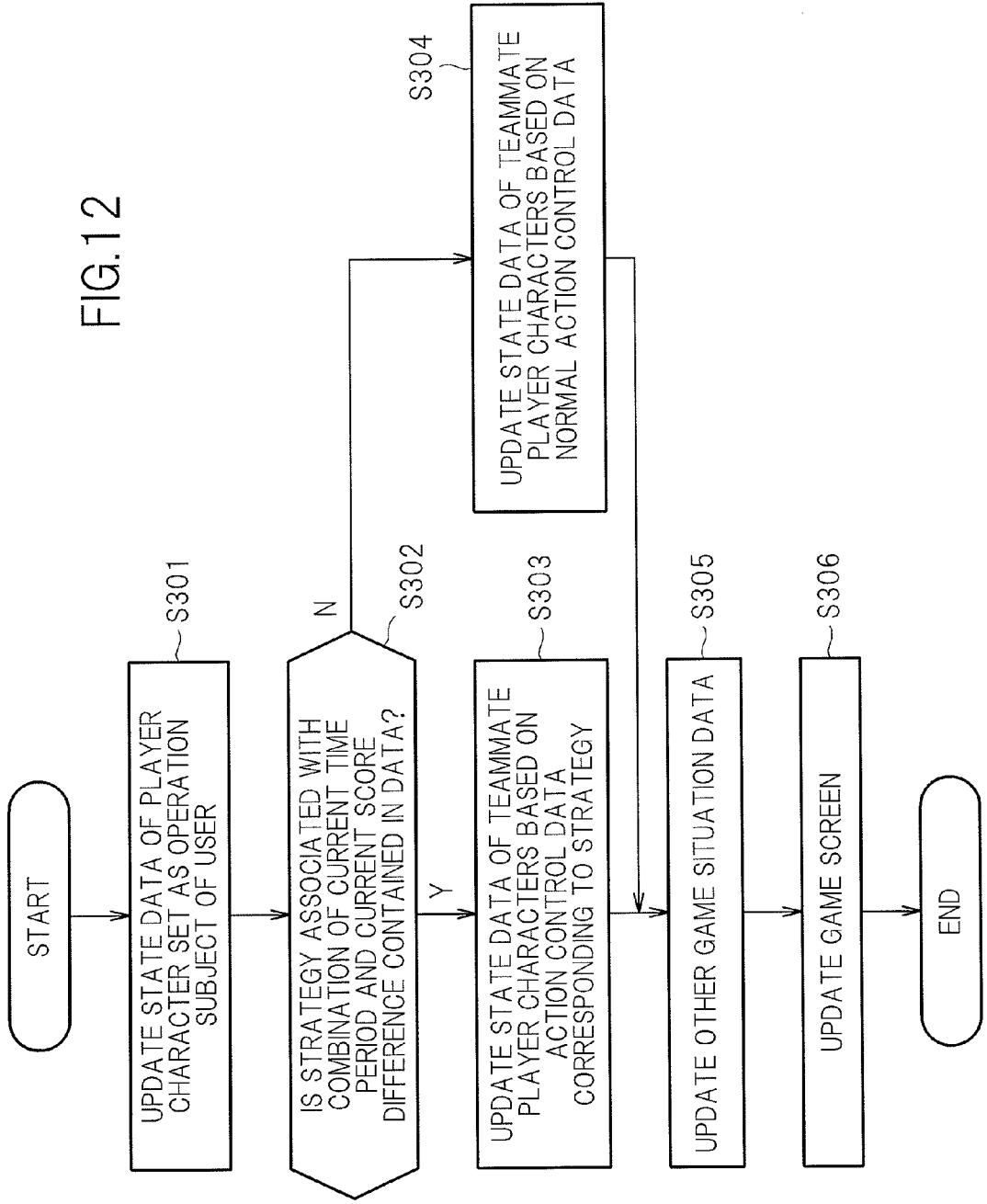
FIG. 12 is another flowchart illustrating the example of processing performed by the game device.

FIG. 12 is a flowchart illustrating processing performed in the game device 10 during the match (Step S103 of FIG. 2). The control unit 14 performs the processing illustrated in FIG. 12 at predetermined intervals (for example, every $1/60^{th}$ of a second) according to the program read from the optical disc 36. By performing the processing illustrated in FIG. 12, the first determination section 80, the second determination section 82, and the game-character control section 84 are implemented.

As illustrated in FIG. 12, the control unit 14 first updates the state data of the player character 56, which is set as the operation subject of the user, based on the operation signal fed from the controller 30 (S301). Specifically, the control unit 14 controls the player character 56 set as the operation subject of the user according to the operation performed by the user.

Thereafter, the control unit 14 (the first determination section 80 and the second determination section 82) refers to the strategy data to determine whether or not the strategy associated with the combination of the current time period and the current score difference is contained in the strategy data (S302). For example, the control unit 14 determines whether or not the current time point is contained in the time period, for each of the time periods respectively associated with the strategies. Moreover, the control unit 14 determines whether or not the score difference is a score difference at the current time point, for each of the score differences respectively associated with the strategies. For example, for the combination of the time period and the score difference, which are associated with the strategy "A", when the current time point is contained in the time period and the score difference is the score difference at the current time point, the control unit 14 determines that the strategy "A" is a strategy associated with the combination of the current time period and the current score difference.

When the strategy associated with the combination of the current time period and the current score difference is contained in the strategy data, the control unit 14 (game-character control section 84) updates the state data of the teammate player characters based on the action control data (AI) corresponding to the strategy (S303). In this case, the teammate player characters are controlled so as to implement the strategy associated with the combination of the current time period and the current score difference. For example, when the strategy associated with the combination of the current time period and the current score difference is "counter attack", the teammate player characters are controlled to perform "counter attack".

On the other hand, when it is determined in Step S302 that the strategy associated with the combination of the current time period and the current score difference is not contained in the strategy data, the control unit 14 updates the state data of the teammate player characters based on normal action control data (AI) (S304). In this case, the state data of the teammate player characters is not updated based on the action control data (AI) corresponding to the strategy. Therefore, the teammate player characters do not implement the strategy.

After the state data of the teammate player characters is updated in Step S303 or S304, the control unit 14 updates the other game situation data (S305). For example, the state data of the player characters 56 belonging to the opponent team is updated. Moreover, the state data of the ball 58 and the virtual camera 59 is updated. Further, the elapsed-time data is updated. Moreover, when a scoring event occurs for any of the teams, the score data is also updated.

Thereafter, the control unit 14 updates the game screen (S306). The control unit 14 creates the image representing the game space 50 viewed from the virtual camera 59 on the VRAM. Then, the control unit 14 draws the cursor 60 or the like on the image created on the VRAM. The image created on the VRAM in this manner is displayed on the display unit 32 as the game screen.

In the game device 10 described above, the strategy screen is displayed (FIG. 3). According to the strategy screen, the user can set the situations (time period and score difference) in which the user team is to implement the strategy by the relatively simple operation of specifying the position or the area in the underlying image 40. In other words, the user can set two conditions (time period and score difference) which are to be satisfied so that the user team implements the strategy, by the single operation of specifying the position or the area in the underlying image 40. According to the game device 10, the user interface which enables the user to relatively easily set the situations in which the user team is to implement the strategy can be realized. Specifically, according to the game device 10, the efforts for setting the situations in which the user team is to implement the strategy can be reduced.

The present invention is not limited to the embodiment described above.

(1) For example, the display control section 72 may control the display mode of the bar 46 based on the ability parameter data and/or the state parameter data of the user team.

In some cases, the strategy selected by the user is not fully implemented depending on the abilities or states of the player characters 56 belonging to the user team. For example, the player characters 56 move intensely for performing "zone press". Therefore, when the endurances or stamina of the player characters 56 are low, "zone press" will not be fully implemented.

Therefore, the display control section 72 may change the display mode of the bar 46 corresponding to "zone press" based on the endurance parameters (or the stamina parameters) of the player characters 56 belonging to the user team. For example, the display mode of the bar 46 corresponding to "zone press" may be changed between the case where the endurances of the player characters 56 belonging to the user team are high and the case where the endurances of the player characters 56 belonging to the user team are low. The operation "changing the display mode of the bar 46" means changing a color, a pattern, a transparency, or a shape of the bar 46. Moreover, blinking of the bar 46 and the display of a predetermined image on the bar 46 are included in "changing the display mode of the bar 46".

The display control section 72 may change the display mode of the bar 46 corresponding to the strategy other than "zone press" based on the parameters associated with the strategy.

In this modified example, data, for example, illustrated in FIG. 13 is stored in the storage section 70 as data for controlling the display mode of the bar 46. The data illustrated in FIG. 13 is data obtained by associating the strategy (action control data) and a parameter condition relating to the parameter. More specifically, the data illustrated in FIG. 13 contains a "strategy" field and a "parameter condition" field. The "strategy" field indicates information for identifying the strategy (strategy ID). The "parameter condition" field indicates a condition relating to the parameter. For example, the "parameter condition" field indicates a parameter value that the player characters 56 belonging to the user team should have for fully implementing the strategy. In the data illustrated in FIG. 13, the condition relating to the endurance parameter is associated with "zone press". However, a condition relating to the stamina parameter may alternatively be associated with "zone press".

The display control section 72 controls the display mode of the bar 46 based on the ability parameter data of the user team and the data illustrated in FIG. 13. For example, for determining the display mode of the bar 46 corresponding to "zone press", the display control section 72 determines whether or not the ability parameter data of the user team satisfies the parameter condition associated with "zone press". For example, the display control section 72 acquires a statistic (for example, an average value) of the endurance parameters of the player characters 56 belonging to the user team. Then, the display control section 72 determines whether or not the statistic satisfies the parameter condition associated with "zone press". When the statistic satisfies the parameter condition associated with "zone press", it is determined that the ability parameter data of the user team satisfies the parameter condition associated with "zone press".

Then, the display control section 72 makes the display mode of the bar 46 corresponding to "zone press" different between the case where the ability parameter data of the user team satisfies the parameter condition and the case where the ability parameter data of the user team does not satisfy the parameter condition. For example, when the ability parameter data of the user team satisfies the parameter condition, the display mode (for example, the color) of the bar 46 is set to a first display mode (for example, a first color). On the other hand, when the ability parameter data of the user team does not satisfy the parameter condition, the display mode of the bar 46 (for example, the color) is set to a second display mode (for example, a second color which is lighter than the first color).

According to the modified example described above, the user can relatively easily know whether or not the user team can fully implement the strategy selected by the user by referring to the display mode of the bar 46.

(2) For example, the display control section 72 may control the display mode of the bar 46 based on a size of the range on the first axis 42a, which corresponds to the area specified by the operation received by the receiving section 74, and the ability parameter data and/or the state parameter data of the user team.

In some cases, the user team cannot fully implement the strategy selected by the user over the time period specified by the user, depending on the abilities or states of the player characters 56 belonging to the user team. For example, for implementing "zone press", the player characters 56 move intensely. Therefore, if the period set by the user as a period in which the strategy is implemented is long and the player characters 56 do not have sufficient endurance or stamina to implement "zone press" over the period, "zone press" will not be fully implemented.

Therefore, the display control section 72 may change the display mode of the bar 46 corresponding to "zone press" based on the size of the range on the first axis 42a, which corresponds to the bar 46, and the endurance parameters (or the stamina parameters) of the player characters 56 belonging to the user team.

In this modified example, data, for example, illustrated in FIG. 14 is stored as data for controlling the display mode of the bar 46. The data illustrated in FIG. 14 is data obtained by associating the strategy (action control data), range condition relating to a size of a range on the first axis 42a, and a parameter condition relating to the parameter. More specifically, the data illustrated in FIG. 14 contains a "strategy" field, a "length of time period of implementation" field, and a "parameter condition" field.

The "strategy" field indicates information for identifying the strategy (strategy ID). The "length of time period of implementation" field indicates a condition relating to a length of the time period set by the user as a time period in which the strategy is to be implemented. A condition indicated by the "length of time period of implementation" field corresponds to a condition relating to a size of a range on the first axis 42a. The "parameter condition" field indicates a condition relating to the parameter of the player characters 56 belonging to the user team. For example, the "parameter condition" field indicates a parameter value that the player characters 56 belonging to the user team should have for fully implementing the strategy over the period set by the user.

The display control section 72 controls the display mode of the bar 46 based on the ability parameter data of the user team and the data illustrated in FIG. 14. For example, for determining the display mode of the bar 46 corresponding to "zone press", the display control section 72 acquires a parameter condition which corresponds to a length of the time period indicated by the bar 46 (specifically, a size of the range on the first axis 42a which corresponds to the bar 46) from the data illustrated in FIG. 14, and further determines whether or not the ability parameter data of the user team satisfies the parameter condition. For example, the display control section 72 acquires a statistic (for example, an average value) of the endurance parameters of the player characters 56 belonging to the user team. Then, the display control section 72 determines whether or not the statistic satisfies the parameter condition. When the statistic satisfies the parameter condition, it is determined that the ability parameter data of the user team satisfies the parameter condition.

Then, the display control section 72 makes the display mode of the bar 46 corresponding to "zone press" different between the case where the ability parameter data of the user team satisfies the parameter condition and the case where the ability parameter data of the user team does not satisfy the parameter condition. For example, when the ability parameter data of the user team satisfies the parameter condition, the display mode (for example, the color) of the bar 46 is set to the first display mode (for example, the first color). On the other hand, when the ability parameter data of the user team does not satisfy the parameter condition, the display mode of the bar 46 (for example, the color) is set to the second display mode (for example, the second color which is lighter than the first color).

According to the modified example described above, the user can relatively easily know whether or not the user team can fully implement the strategy selected by the user over the period set by the user by referring to the display mode of the bar 46.

(3) For example, the display control section 72 may control the display mode of the bar 46 based on the formation of the user team.

When the formation of the user team is not suitable for the strategy selected by the user, the strategy selected by the user will not be fully implemented. Therefore, the display control section 72 may change the display mode of the bar 46 based on the formation of the user team. For example, the display control section 72 may change the display mode of the bar 46 corresponding to the strategy between the case where the formation of the user team is suitable for the strategy and the case where the formation of the user team is not suitable for the strategy.

In this modified example, data, for example, illustrated in FIG. 15 is stored as the data for controlling the display mode of the bar 46. The data illustrated in FIG. 15 is obtained by associating the strategy (action control data) and a formation condition relating to the formation of the user with each other. More specifically, the data illustrated in FIG. 15 contains a "strategy" field and a "formation condition" field. The "strategy" field indicates information (strategy ID) for identifying the strategy. The "formation condition" field indicates a condition relating to the formation. For example, the "formation condition" indicates a formation suitable for implementing the strategy.

The display control section 72 controls the display mode of the bar 46 based on the formation of the user team and the data illustrated in FIG. 15. For example, for determining the display mode of the bar 46 corresponding to "side attack", the display control section 72 determines whether or not the formation of the user team satisfies the formation condition associated with "side attack".

Then, the display control section 72 makes the display mode of the bar 46 corresponding to "side attack" different between the case where the formation of the user team satisfies the formation condition and the case where the ability parameter data of the user team does not satisfy the formation condition. For example, when the formation of the user team satisfies the formation condition, the display mode (for example, the color) of the bar 46 is set to the first display mode (for example, the first color). On the other hand, when the formation of the user team does not satisfy the formation condition, the display mode of the bar 46 (for example, the color) is set to the second display mode (for example, the second color which is lighter than the first color).

According to the modified example described above, the user can relatively easily know whether or not the formation of the user team is suitable for the strategy selected by the user by referring to the display mode of the bar 46.

(4) For example, the display control section 72 may control the display mode of the bar 46 based on the ability parameter data and/or the state parameter data of the opponent team.

In some cases, the strategy selected by the user is not fully implemented depending on the abilities or states of the player characters 56 belonging to the opponent team. For example, when a defensive skill or stamina of the player character 56 of the opponent team, which is assigned to a position in the vicinity of a touchline, is high, "side attack" is not fully effective in some cases.

Therefore, the display control section 72 may change the display mode of the bar 46 corresponding to "side attack" based on a defensive-skill parameter of the player character

56 of the opponent team, which is assigned to the position in the vicinity of the touchline. For example, the display mode of the bar 46 corresponding to "side attack" may be changed between the case where the defensive skill is high and the case where the defensive skill is low.

Even for the strategy other than "side attack", the display control section 72 may change the display mode of the bar 46 based on the parameter of the player character 56 of the opponent team, which is assigned to a position related with the strategy.

In this modified example, data, for example, illustrated in FIG. 16 is stored as data for controlling the display mode of the bar 46. The data illustrated in FIG. 16 is data obtained by associating the strategy (action control data) and a parameter condition relating to the parameter. More specifically, the data illustrated in FIG. 16 contains a "strategy" field and a "parameter condition" field. The "strategy" field indicates information for identifying the strategy (strategy ID). The "parameter condition" field indicates a condition relating to the parameter. For example, the "parameter condition" field indicates a parameter value that the player characters 56 belonging to the opponent team should have for preventing the user team from fully implementing the strategy.

The display control section 72 controls the display mode of the bar 46 based on the ability parameter data of the opponent team and the data illustrated in FIG. 16. For example, for determining the display mode of the bar 46 corresponding to "side attack", the display control section 72 determines whether or not the ability parameter data of the opponent team satisfies the parameter condition associated with "side attack". For example, the display control section 72 acquires a statistic (for example, an average value) of the defensive-skill parameter of the player character 56 belonging to the opponent team, which is assigned to the position in the vicinity of the touchline. Then, the display control section 72 determines whether or not the statistic satisfies the parameter condition associated with "side attack". When the statistic satisfies the parameter condition associated with "side attack", it is determined that the ability parameter data of the opponent team satisfies the parameter condition associated with "side attack".

Then, the display control section 72 makes the display mode of the bar 46 corresponding to "side attack" different between the case where the ability parameter data of the opponent team satisfies the parameter condition and the case where the ability parameter data of the opponent team does not satisfy the parameter condition. For example, when the ability parameter data of the opponent team does not satisfy the parameter condition, the display mode (for example, the color) of the bar 46 is set to the first display mode (for example, the first color). On the other hand, when the ability parameter data of the opponent team satisfies the parameter condition, the display mode of the bar 46 (for example, the color) is set to the second display mode (for example, the second color which is lighter than the first color).

According to the modified example described above, the user can relatively easily know whether or not the user team can fully implement the strategy selected by the user by referring to the display mode of the bar 46.

(5) For example, the display control section 72 may control the display mode of the bar 46 based on the formation of the opponent team.

When the formation of the opponent team is suitable for preventing the implementation of the strategy selected by the user, the strategy selected by the user will not be fully implemented. Therefore, the display control section 72 may change the display mode of the bar 46 corresponding to the strategy between the case where the formation of the opponent team is suitable for preventing the implementation of the strategy and the case where the formation of the opponent team is not suitable for preventing the implementation of the strategy.

In this modified example, data, for example, illustrated in FIG. 17 is stored as the data for controlling the display mode of the bar 46. The data illustrated in FIG. 17 is obtained by associating the strategy (action control data) and a formation condition relating to the formation of the opponent team with each other. More specifically, the data illustrated in FIG. 17 contains a "strategy" field and a "formation condition" field. The "strategy" field indicates information (strategy ID) for identifying the strategy. The "formation condition" field indicates a condition relating to the formation. For example, the data in the "formation condition" indicates a formation suitable for preventing the implementation of the strategy.

The display control section 72 controls the display mode of the bar 46 based on the formation of the opponent team and the data illustrated in FIG. 17. For example, for determining the display mode of the bar 46 corresponding to "side attack", the display control section 72 determines whether or not the formation of the opponent team satisfies the formation condition associated with "side attack".

Then, the display control section 72 makes the display mode of the bar 46 corresponding to "side attack" different between the case where the formation of the opponent team satisfies the formation condition and the case where the formation of the opponent team does not satisfy the formation condition. For example, when the formation of the opponent team does not satisfy the formation condition, the display mode (for example, the color) of the bar 46 is set to the first display mode (for example, the first color). On the other hand, when the formation of the opponent team satisfies the formation condition, the display mode of the bar 46 (for example, the color) is set to the second display mode (for example, the second color which is lighter than the first color).

According to the modified example described above, the user can relatively easily know whether or not the user team can fully implement the strategy selected by the user by referring to the display mode of the bar 46.

(6) A plurality of the modified examples (1) to (5) described above may be combined with each other.

(7) The strategy may be implemented, for example, when at least one of the "first condition" acquired by the first-condition acquiring section 76 and the "second condition" acquired by the second-condition acquiring section 78 is satisfied.

(8) For example, the selection of the strategy which is not suitable for the formation of the user team as the strategy of the user team may be restricted (for example, inhibited). For example, when the formation of the user team is a formation which is not suitable for "side attack", "side attack" may be prevented from being selected from the strategy menu.

(9) The game device 10 may include, for example, a pointing device such as a mouse, a touch panel, or a controller having a pointing function (function of pointing out a position in the game screen). In this case, on the strategy screen, the user may indicate a position or an area on the underlying image 40 by using the pointing device. In this case, the display of the cursor 48 may be omitted.

(10) Further, the game space may be, for example, a virtual two-dimensional space in which two coordinate axes are set. Specifically, the game space may be a virtual two-dimensional space in which the position of the player character or the ball is identified by two coordinate elements.

(11) Further, for example, the present invention is also applicable to other sports games (such as a basketball game, an ice hockey game, a baseball game, and the like) instead of the soccer game. Further, the present invention is applicable to games other than sports games. The present invention is applicable to a game in which one or a plurality of game characters move based on action control data. According to the present invention, it is possible to realize the user interface which enables the user to relatively easily set up the situations in which one or a plurality of game characters is (are) to be controlled based on the action control data.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A game device for implementing a game in which at least one game character acts, the game device comprising:
   at least one microprocessor configured to:
      acquires, from a storage, action control data for controlling an action of the at least one game character; and
      control a display to display an image on which a first axis corresponding to first information about a situation of the game and a second axis corresponding to second information about a situation of the game are set;
      receive an operation of specifying one of a position and an area in the image;
      acquire a first condition relating to the first information based on one of a position and a range on the first axis, corresponding to the one of the position and the area specified by the operation;
      acquire a second condition relating to the second information based on one of a position and a range on the second axis, corresponding to the one of the position and the area specified by the operation;
      determine in a first determination whether the first information about a current situation of the game satisfies the first condition;
      determine in a second determination whether the second information about a current situation of the game satisfies the second condition; and
      control the action of the at least one game character based on the action control data according to the results of the first determination and the second determination,
   wherein the at least one microprocessor acquires, from at least one memory, parameter data relating to at least one of an ability and a state of the at least one game character, and
   wherein the at least one microprocessor controls the display to display an image indicating the one of the position and the area specified by the operation; and controls a display mode of the image indicating the one of the position and the area specified by the operation based on the parameter data.

2. The game device according to claim 1,
   wherein the storage stores a parameter condition corresponding to a condition relating to the parameter data in association with the action control data,
   wherein the at least one microprocessor controls the display mode of the image indicating the one of the position and the area specified by the operation based on the parameter data and the parameter condition, and changes the display mode of the image indicating the one of the position and the area specified by the operation between a case where the parameter data satisfies the parameter condition and a case where the parameter data does not satisfy the parameter condition.

3. The game device according to claim 1,
   wherein the storage stores a range condition corresponding to a condition relating to a size of a range on the first axis and a parameter condition corresponding to a condition relating to the parameter data in association with each other,
   wherein the at least one microprocessor controls the display mode of the image indicating the area specified by the operation based on the parameter data and a content stored in the storage section, and changes the display mode of the image indicating the area specified by the operation between a case where the parameter condition associated with the range condition satisfied by the size of the range on the first axis, corresponding to the area specified by the operation, is satisfied by the parameter data and a case where the parameter condition associated with the range condition satisfied by the size of the range on the first axis, corresponding to the area specified by the operation, is not satisfied by the parameter data.

4. A method of controlling a game device including at least one processor, the game device for implementing a game in which at least one game character acts, the method comprising:
   acquiring, using the at least one processor, action control data for controlling an action of the at least one game character, which is stored a memory that stores the action control data;
   controlling, using the at least one processor, a display to display an image on which a first axis corresponding to first information about a situation of the game and a second axis corresponding to second information about a situation of the game are set;
   receiving an operation of specifying one of a position and an area in the image;
   acquiring, using the at least one processor, a first condition relating to the first information based on one of a position and a range on the first axis, corresponding to the one of the position and the area specified by the operation;
   acquiring, using the at least one processor, a second condition relating to the second information based on one of a position and a range on the second axis, corresponding to the one of the position and the area specified by the operation;
   determining, using the at least one processor, whether the first information about a current situation of the game satisfies the first condition;
   determining whether the second information about a current situation of the game satisfies the second condition; and
   controlling the action of the at least one game character based on the action control data according to the results of the first determination and the second determination,
   wherein the game comprises a game in which a plurality of the game characters act,
   wherein the method further comprises:
   acquiring a formation condition from at least one memory that stores the formation condition corresponding to a condition relating to a formation of the plurality of the game characters in association with the action control data; and
   controlling, using the at least one processor, the display to display the image indicating the one of the position and the area specified by the operation, and controlling, using the at least one processor, a display mode of the image indicating the one of the position and the area specified by the operation based on the formation of the plurality of the game characters and the formation condition, and changing, using the at least one processor, the display mode of the image indicating the one of the position and the area specified by the operation between a case where the formation of the plurality of the game characters satisfies the formation condition and a case where the formation of the plurality of the game characters does not satisfy the formation condition.

5. A method of controlling a game device including at least one processor, the game device for implementing a game in which at least one game character acts, the method comprising:

acquiring, using the at least one processor, action control data for controlling an action of the at least one game character, which is stored in a memory that stores the action control data;

controlling, using the at least one processor, a display to display an image on which a first axis corresponding to first information about a situation of the game and a second axis corresponding to second information about a situation of the game are set;

receiving an operation of specifying one of a position and an area in the image;

acquiring, using the at least one processor, a first condition relating to the first information based on one of a position and a range on the first axis, corresponding to the one of the position and the area specified by the operation;

acquiring, using the at least one processor, a second condition relating to the second information based on one of a position and a range on the second axis, corresponding to the one of the position and the area specified by the operation;

determining, using the at least one processor, whether the first information about a current situation of the game satisfies the first condition;

determining whether the second information about a current situation of the game satisfies the second condition; and controlling the action of the at least one game character based on the action control data according to the results of the first determination and the second determination, wherein the game comprises a game in which at least one first game character and at least one second game character act, wherein the action control data comprises data for controlling an action of the at least one first game character, wherein the method further comprises:

controlling, using the at least one processor, the action of the at least one first game character based on the action control data according to the results of the first determination and the second determination;

acquiring parameter data and a parameter condition from at least one memory that stores the parameter data relating to at least one of an ability and a state of the at least one second game character, and the parameter condition corresponding to a condition relating to the parameter data in association with the action control data; and controlling, using the at least one processor, the display to display an image indicating the one of the position and the area specified by the operation, and controlling, using the at least one processor, a display mode of the image indicating the one of the position and the area specified by the operation based on the parameter data and the parameter condition, and changing, using the at least one processor, the display mode of the image indicating the one of the position and the area specified by the operation between a case where the parameter data satisfies the parameter condition and a case where the parameter data does not satisfy the parameter condition.

6. A method of controlling a game device including at least one processor, the game device for implementing a game in which at least one game character acts, the method comprising:

acquiring, using the at least one processor, action control data for controlling an action of the at least one game character, which is stored in a memory that stores the action control data;

controlling, using the at least one processor, a display to display an image on which a first axis corresponding to first information about a situation of the game and a second axis corresponding to second information about a situation of the game are set;

receiving an operation of specifying one of a position and an area in the image;

acquiring, using the at least one processor, a first condition relating to the first information based on one of a position and a range on the first axis, corresponding to the one of the position and the area specified by the operation;

acquiring, using the at least one processor, a second condition relating to the second information based on one of a position and a range on the second axis, corresponding to the one of the position and the area specified by the operation;

determining, using the at least one processor, whether the first information about a current situation of the game satisfies the first condition;

determining whether the second information about a current situation of the game satisfies the second condition; and controlling the action of the at least one game character based on the action control data according to the results of the first determination and the second determination, wherein the game comprises a game in which a plurality of first game characters and a plurality of second game characters act, wherein the action control data comprises data for controlling actions of the plurality of first game characters, wherein the method further comprises:

controlling, using the at least one processor, the actions of the plurality of first game characters based on the action control data according to the results of the first determination and the second determination, acquiring a formation condition from at least one memory that stores the formation condition corresponding to a condition relating to a formation of the plurality of second game characters in association with the action control data, controlling, using the at least one processor, the display to display an image indicating the one of the position and the area specified by the operation, controlling, using the at least one processor, a display mode of the image indicating the one of the position and the area specified by the operation based on the formation of the plurality of second game characters and the formation condition, and changing, using the at least one processor, the display mode of the image indicating the one of the position and the area specified by the operation between a case where the formation of the plurality of second game characters satisfies the formation condition and a case where the formation of the plurality of second game characters does not satisfy the formation condition.

7. A method of controlling a game device including at least one processor, the game device for implementing a game in which at least one game character acts, the method comprising:

acquiring, using the at least one processor, action control data for controlling an action of the at least one game character, which is stored in means for storing the action control data;

controlling, using the at least one processor, a display to display an image on which a first axis corresponding to first information about a situation of the game and a second axis corresponding to second information about a situation of the game are set;

receiving an operation of specifying one of a position and an area in the image;

acquiring, using the at least one processor, a first condition relating to the first information based on one of a position and a range on the first axis, corresponding to the one of the position and the area specified by the operation;

acquiring, using the at least one processor, a second condition relating to the second information based on one of a position and a range on the second axis, corresponding to the one of the position and the area specified by the operation;

determining, using the at least one processor, whether the first information about a current situation of the game satisfies the first condition;

determining whether the second information about a current situation of the game satisfies the second condition;

controlling the action of the at least one game character based on the action control data according to the results of the first determination and the second determination;

acquiring, from at least one memory, parameter data relating to at least one of an ability and a state of the at least one game character; and controlling the display to display an image indicating the one of the position and the area specified by the operation; and controlling a display mode of the image indicating the one of the position and the area specified by the operation based on the parameter data.

8. A non-transitory computer readable information storage medium storing a program for causing a computer to function as a game device for implementing a game in which at least one game character acts, the program further causing the computer to function as:

an acquiring section that acquires, from a memory, action control data for controlling an action of the at least one game character;

a display control section that controls a display to display an image on which a first axis corresponding to first information about a situation of the game and a second axis corresponding to second information about a situation of the game are set;

a receiving section that receives an operation for specifying one of a position and an area in the image;

a first-condition acquiring section that acquires a first condition relating to the first information based on one of a position and a range on the first axis corresponding to the one of the position and the area specified by the operation;

a second-condition acquiring section that acquires a second condition relating to the second information based on one of a position and a range on the second axis corresponding to the one of the position and the area specified by the operation;

a first determination section that determines whether the first information about a current situation of the game satisfies the first condition;

a second determination section that determines whether the second information about a current situation of the game satisfies the second condition;

a game-character control section that controls the action of the at least one game character based on the action control data according to the results of the first determination and the second determination;

a section that acquires, from at least one memory, parameter data relating to at least one of an ability and a state of the at least one game character; and a section that controls the display to display an image indicating the one of the position and the area specified by the operation; and controls a display mode of the image indicating the one of the position and the area specified by the operation based on the parameter data.

* * * * *